US012586116B2

(12) United States Patent
Cascetta et al.

(10) Patent No.: US 12,586,116 B2
(45) Date of Patent: Mar. 24, 2026

(54) PRODUCT RECOMMENDATION METHOD

(71) Applicant: LUXOTTICA GROUP S.P.A., Milan (IT)

(72) Inventors: Cristian Cascetta, Milan (IT); Fabio Mazzarella, Busto Arsizio (IT); Luca Mazzocchi, Legnano (IT); Kamal Fahmy Salama, Monza (IT); Filippo Bruno, Milan (IT)

(73) Assignee: LUXOTTICA GROUP S.P.A., Milan (IT)

( * ) Notice: Subject to any disclaimer, the term of this patent is extended or adjusted under 35 U.S.C. 154(b) by 411 days.

(21) Appl. No.: 17/878,404

(22) Filed: Aug. 1, 2022

(65) Prior Publication Data

US 2023/0044387 A1     Feb. 9, 2023

(30) Foreign Application Priority Data

Aug. 9, 2021     (IT) ......................... 102021000021545

(51) Int. Cl.
G06Q 30/0601          (2023.01)
(52) U.S. Cl.
CPC ................................ G06Q 30/0631 (2013.01)
(58) Field of Classification Search
CPC . G06Q 30/0631; G06Q 30/0601–0643; G06Q 30/08
USPC ................................................ 705/26.1–27.2
See application file for complete search history.

(56) References Cited

U.S. PATENT DOCUMENTS

| | | | | |
|---|---|---|---|---|
| 7,720,720 B1 * | 5/2010 | Sharma | .................. | G06Q 30/02 |
| | | | | 705/26.7 |
| 2015/0142704 A1 * | 5/2015 | London | ............... | G10L 15/1822 |
| | | | | 706/11 |
| 2019/0228855 A1 * | 7/2019 | Leifer | ............... | G06F 16/90324 |

FOREIGN PATENT DOCUMENTS

| | | | | |
|---|---|---|---|---|
| CA | 2764056 A | 12/2010 | | |
| CN | 111242748 A | * 6/2020 | .......... | G06F 18/2411 |
| KR | 20130033506 A | * 4/2013 | ......... | G06Q 30/0631 |

OTHER PUBLICATIONS

Applying Bayesian Network and Association Rule Analysis for Product Recommendation (Year: 2011).*

(Continued)

*Primary Examiner* — Ashley D Preston
(74) *Attorney, Agent, or Firm* — CANTOR COLBURN LLP

(57)          ABSTRACT

A product recommendation method includes an indexing step implementing a Bayesian network capable of creating direct matches between each respective product of a product catalog and an ideal user whose characteristics are the most likely to be suitable for the respective products. The indexing step includes inputting a first descriptor vector of a product into the Bayesian network to obtain the user-characteristics most likely to be suitable for the product. The product recommendation method further includes a refining process which identifies determinants associated with nodes and conditional probabilities of the Bayesian network to minimize errors at the nodes to which the arcs of the Bayesian network point.

11 Claims, 5 Drawing Sheets

(56) References Cited

OTHER PUBLICATIONS

Tuning related-items recommenders with Bayesian Optimization, published in Adevinta Tech Blog (2021) (Year: 2021).*
Ricci et al., "Recommender systems handbook" Springer, Oct. 28, 2010 (pages ToC, Ch01-Ch07-* Chapters 22-23*).
Search Report issued for Italian Patent Application No. 102021000021545; Application Filing Date Aug. 9, 2021; Date of Completion Apr. 22, 2022 (2 pages).

* cited by examiner

PRODUCT RECOMMENDATION METHOD

The present invention refers to a product recommendation method adapted to recommend to a user the products best suitable for his profile and claims priority to Italian Application Serial No. 102021000021545, filed Aug. 9, 2021, the contents of which are incorporated by reference herein in its entirety.

In this discussion, the terms "product" and "article" will be used without any distinction of meaning between them to refer to products, multimedia content, images that can be found on the Internet.

As is well known, during browsing and as a result of searches on search engines and online purchases on the Internet, a quantity of data is generated relating to the above-mentioned activities that can be aimed at building real virtual and probabilistic profiles of the users. These profiles can be used to improve, speed up and simplify online searches as well as to prioritise in the results of a search for an online purchase certain products that are estimated to be most interesting to the user carrying out the search. The latter aim is achieved through the use of computer programs or software that implement the so-called product recommendation methods. Recommendation methods are widely used to direct users to articles (contents, images, products) that could meet their information needs, provide a better experience and maximise business key performance indicators (KPIs) such as conversion rate, click-through rate, up-selling and cross-selling.

Three types of product recommendation methods are known today.

In particular, the product recommendation methods of a first type are those based on historical data, the product recommendation methods of a second type are those based on rules and the product recommendation methods of a third type are those based on Bayesian networks.

The product recommendation methods based on historical data implement recommendation algorithms that are "trained" starting from the analysis of huge amounts of historical data on user behaviour. These algorithms, in particular, can perform statistical analysis, or graph analysis, or employ neural networks. Such recommendation algorithms are, therefore, able to predict the most likely products of interest for a user using as input data the same classes of "signals" used for training.

In this discussion, "signals" of a user are intended to indicate a dataset that are peculiar to a user such as personal data, data relating to physical characteristics (height, weight, etc.).

In this discussion, "signal classes" are intended to indicate user profiles such as, for example, demographic profiles related to age, gender, geographical references, etc., or purchase profiles or interests, or browsing path profiles.

For example, product recommendation methods of the first type are based on so-called "collaborative filtering" algorithms in which users are grouped into similar behavioural patterns and therefore, when a new user matching a specific pattern is detected, the most "popular" articles common to this group of users (user-user collaborative filter) are recommended. Some variants of these collaborative filtering algorithms involve comparing the co-occurrence patterns of the articles and, when the user chooses an article, recommending the most co-occurring articles to the user as alternatives or up/cross-selling opportunities (collaborative filter article—article).

In this discussion, co-occurrence refers to the eventuality in which certain products or content are purchased or enjoyed together, both in the same session of use, and in different time windows subject to analysis (same week, month, year, etc.). Such products or contents purchased or enjoyed together are referred to as co-occurring.

Another example of recommendation methods of the first type are the so-called "recommendation based on the characteristics of the object to be recommended" algorithms. These algorithms work with a logic similar to that of "collaborative filtering" but instead of using behavioural patterns based on the articles chosen by a plurality of users, they consider the characteristics of the articles and then use the characteristics of the articles that are most likely to attract the user to perform a search among the articles by prioritising the articles that have a greater number of these most likely attractive characteristics. These functionality-based recommendation algorithms are often based on neural networks.

The product recommendation methods of the first type have the advantage of automatically learning the implicit coherent patterns that emerge from data analysis without any formalisation problems.

The advantage lies, therefore, in the fact that no human operator has to make these patterns explicit, but they emerge automatically from the algorithm-mediated interpretation of the data. In addition, these self-learning patterns have the advantage of being re-instructible on a daily, monthly or on-demand basis so as to flexibly adapt to changing users' consumption and use trends.

This implies that such product recommendation methods are able to present unusual, non-common-sense relationships, generating the so-called "lucky break effect". In other words, during a search by a user, he or she is suggested to consider some unexpected articles by virtue of the fact that the recommendation algorithm used has detected some implicit co-occurrence patterns during the learning step with the historical data. For example, one can consider the classic "beer and nappies recommendation" for young male supermarket customers buying nappies for their newborn babies.

The recommendation methods of the first type suffer from some drawbacks.

A first drawback is that the recommendation algorithms on which they are based need large amounts of historical data to be trained, i.e. the so-called "cold-start problem"; the amount of data needed depends on the cardinality of the catalog of the articles, the variety of the characteristics of the articles, the different behavioural patterns and their dependence on geographical, sociological, fashion-dependent factors.

A second drawback is that such recommendation algorithms have a less than zero ability to be inspected, i.e., they behave like black boxes and it is difficult to understand their behaviour or the reason for certain choices. This is because they cannot expound any human-understandable semantic explanation of their internal logic.

The black-box nature of such algorithms also implies that their predictive behaviour is difficult to change in a business-driven logic; the only ways to change it is to pre-process the training data (and the prediction input data at the time of the recommendation) in specific ways, for instance by discretizing the continuous values, or to modify the algorithm's parameters until the results adapt to the expected results, thus limiting uncontrolled behaviour and thus also limiting the benefit of the lucky break effect.

The known product recommendation methods of the first type mitigate this limited control over predictive behaviour by adopting a mixture of different recommendation algorithms and an operator-defined balanced mixing function, with the drawback of making the recommendation software extremely complex to manage.

The rule-based product recommendation methods, i.e., those of the second type, are realised on the basis of pre-defined business rules obtained from an interview process of experts in the field. These rules are formalised in a logical-mathematical way by technology experts and are implemented in a kind of rule engine whose flexibility, performance and maintainability depend on the technology adopted.

In this discussion, the term "rules engine" refers to a software program that implements a set of rules, which are then formalised by means of a sequence of instructions that determine results when certain conditions occur. The rules obtained by the experts in the field must be translated into programming language by qualified technicians, because they are far from the natural language with which the experts in the field formulate them during the interview phase.

In particular, the rules are formulated in such a way as to allow the configuration of a rule engine that takes the user's signals as input and returns the characteristics of articles that are most likely to attract the user; these most likely attractive characteristics are used to perform a search among a set of articles to prioritise articles that have a greater number of these most likely attractive characteristics.

The main advantage of the product recommendation methods of the second type is that it is not necessary to implement large pre-existing datasets and therefore does not present any cold start problems.

Another important advantage is that these product recommendation methods behave in a completely deterministic and completely inspectable manner: any recommendation result can be analysed and the entire decision-making process can be reconstructed and possibly corrected. Furthermore, the rules are formulated in a formal language understandable by humans, which makes it possible to create a quality feedback loop for the experts in the field.

However, the product recommendation methods of the second type suffer from some drawbacks.

The main drawback is that results deriving from the implicit patterns are excluded from design, thus leading to completely predictable recommendation results. Counterintuitive but potentially valuable recommendations are excluded, and this is a disadvantage especially for the so-called "long-tail" articles and the niche user groups.

Another drawback is that the knowledge domain must be completely formalised through a sometimes complex elicitation process by experts, especially when different competences are distributed among different people and roles.

In rule engines such as the expert systems, the logic formalisation level can be a limitation when modeling fuzzy rule sets. In sectors similar to fashion, the experts are not so used to the strict logic formulation of their implicit knowledge, leading to situations of "cultural clash" when setting rules.

In other cases, the number of rules makes the product recommendation methods of the second type difficult to manage in the long term, especially when conflicting rules make it necessary to thoroughly reformulate large series of rules.

There are also drawbacks common to the two types of product recommendation methods described above.

In fact, in some known product recommendation methods, algorithms are sensitive to partially missing input data, especially when they are based on neural networks, resulting in inaccurate and unpredictable behaviour when input data are incomplete.

Another common drawback present in many known product recommendation methods is that the prediction step is preliminary to the extraction of the recommended articles and their classification and is often performed in a separate application. This decoupling may have negative impacts in terms of architectural complexity, performance, coexistence of recommendation ranking with full-text search based on relevance in the set of articles, and classic search engine functionalities such as filtering, paging, etc.

The product recommendation methods of the third type are based on the use of Bayesian networks. As is well known, the Bayesian network is a probabilistic graphical model representing the probabilistic relationship existing between two or more variables. Variables are represented by nodes and causal relationships by arcs that connect two nodes to each other. A node can also be connected to two or more nodes with respective arcs. A causal relationship is associated with each arc. Each node is associated with a probability function that takes the set of values assumed by the parent node(s), that is, by the source node(s), as input. The product recommendation methods of the third type are based on Bayesian networks that probabilistically relate the characteristics of a user to the characteristics of a plurality of products belonging to a products catalog. Such Bayesian networks, therefore, by receiving as input a plurality of data representative of the characteristics of a user, such as age, gender, height, weight, area of origin and so on, are able to output data representative of the probabilities of the user's choice associated with a plurality of the characteristics of the products of the products catalog mentioned above. In particular, these Bayesian networks are realised on the basis of interviews with experts in the field to which the products in the catalog belong.

The recommendation method of the third type, therefore, comprises for each user, the steps:

extracting a plurality of data relating to the user's personal/physical characteristics, e.g., from the user profile of the e-commerce application he/she is using;

querying the Bayesian network using the previously extracted data as input;

obtaining as output from the Bayesian network a plurality of choice probabilities associated with the respective characteristics of products belonging to a products catalog and determining the ideal product as the set of the most likely characteristics;

providing the ideal product as input to the products catalog search engine;

obtaining from the search engine a list of products ordered by "proximity" to the characteristics of the ideal product whereby "proximity" order it is meant increasing order of vector distance between each product in the catalog and the ideal product calculated by the search engine.

The product recommendation methods of the third type offer several advantages deriving from the use of the Bayesian networks. An advantage lies in the fact that Bayesian networks are completely inspectable and their behaviour fully controllable, making them easy to maintain.

In addition, the Bayesian networks can be realised with an elicitation process, avoiding the "cold start" problems typical of recommendation methods of the first type.

The elicitation process used, then, is much simplified in comparison to that of the methods of the second type in that experts in the field are asked to express themselves in probabilistic and non-deterministic terms, making possible even results from implicit patterns that were not initially foreseen. Finally, the Bayesian networks can also work with incomplete input data.

However, the product recommendation methods of the third type suffer from some drawbacks. One drawback lies in their high architectural complexity. In fact, the predictive step of the Bayesian network is on the critical path of the process; therefore, the computer executing the software program that implements this product recommendation method must be structured to withstand the same workloads as the search engine, resulting in cost increases.

Another drawback is the high calculation time resulting from the need to query the Bayesian network for each session.

Aim of the present invention is to overcome the afore-mentioned drawbacks and, in particular, to devise a product recommendation method that has the advantages of the methods based on the use of Bayesian networks, but which at the same time has less computation time and architectural complexity than such methods of the prior art.

These and other aims according to the present invention are achieved by realising a product recommendation method as set forth in claim 1.

A further aim of the present invention is to overcome the aforementioned drawbacks, and in particular to devise a computer program that can be loaded into a memory of an electronic computer and comprising instructions making the electronic computer implement a product recommendation method that has the advantages of the methods based on the use of Bayesian networks, but at the same time has less computation time and architectural complexity than such methods of the prior art.

This further aim according to the present invention is achieved by realising a computer program as set out in claim 8.

Further features of the product recommendation method are the subject-matter of dependent claims.

The features and advantages of a product recommendation method according to the present invention will be more apparent from the following description, which is to be understood as exemplifying and not limiting, with reference to the schematic attached drawings, wherein.

Figure 1:
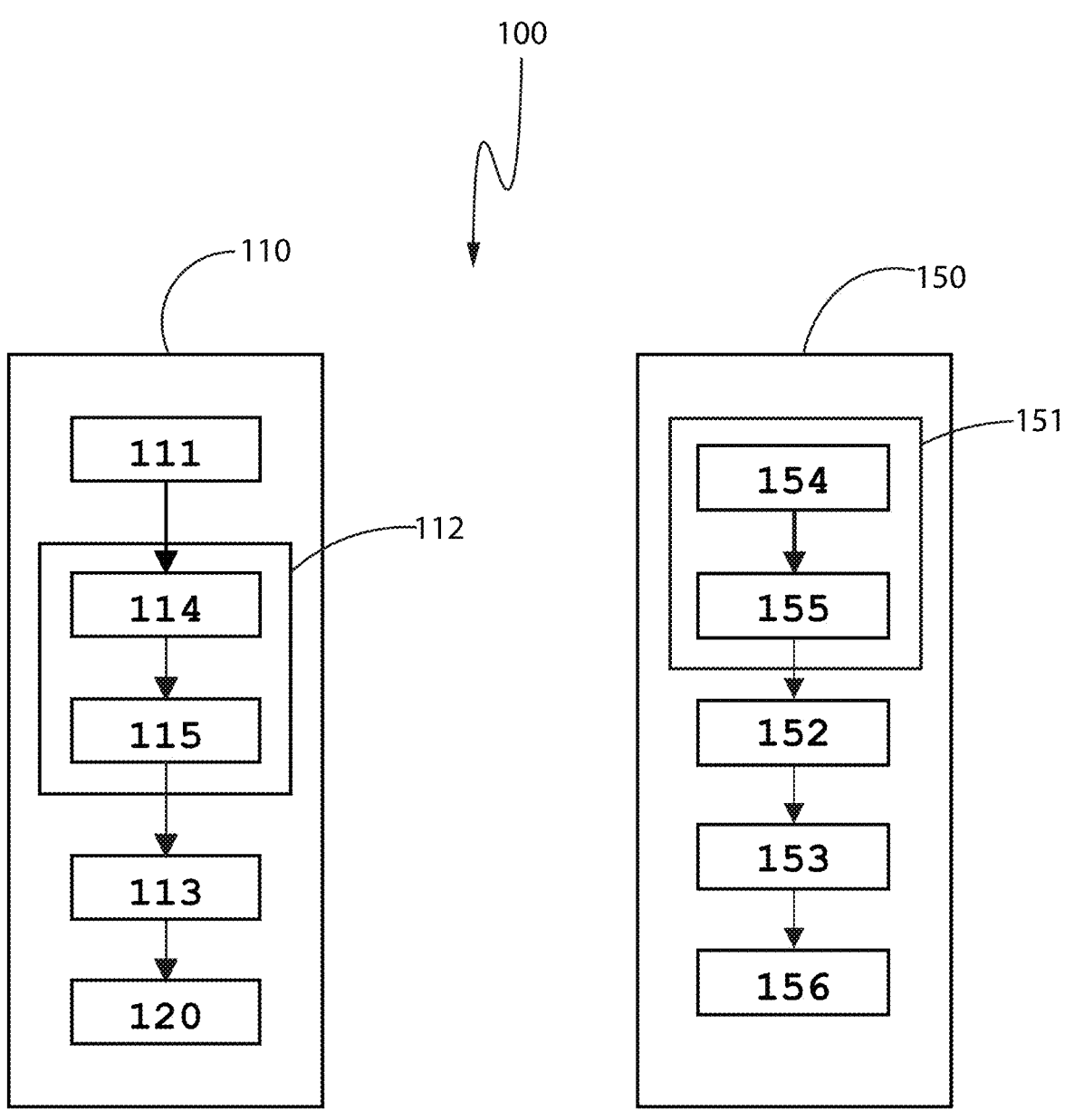
FIG. 1 is a flow chart representing a product recommendation method according to the present invention.
Figure 2:
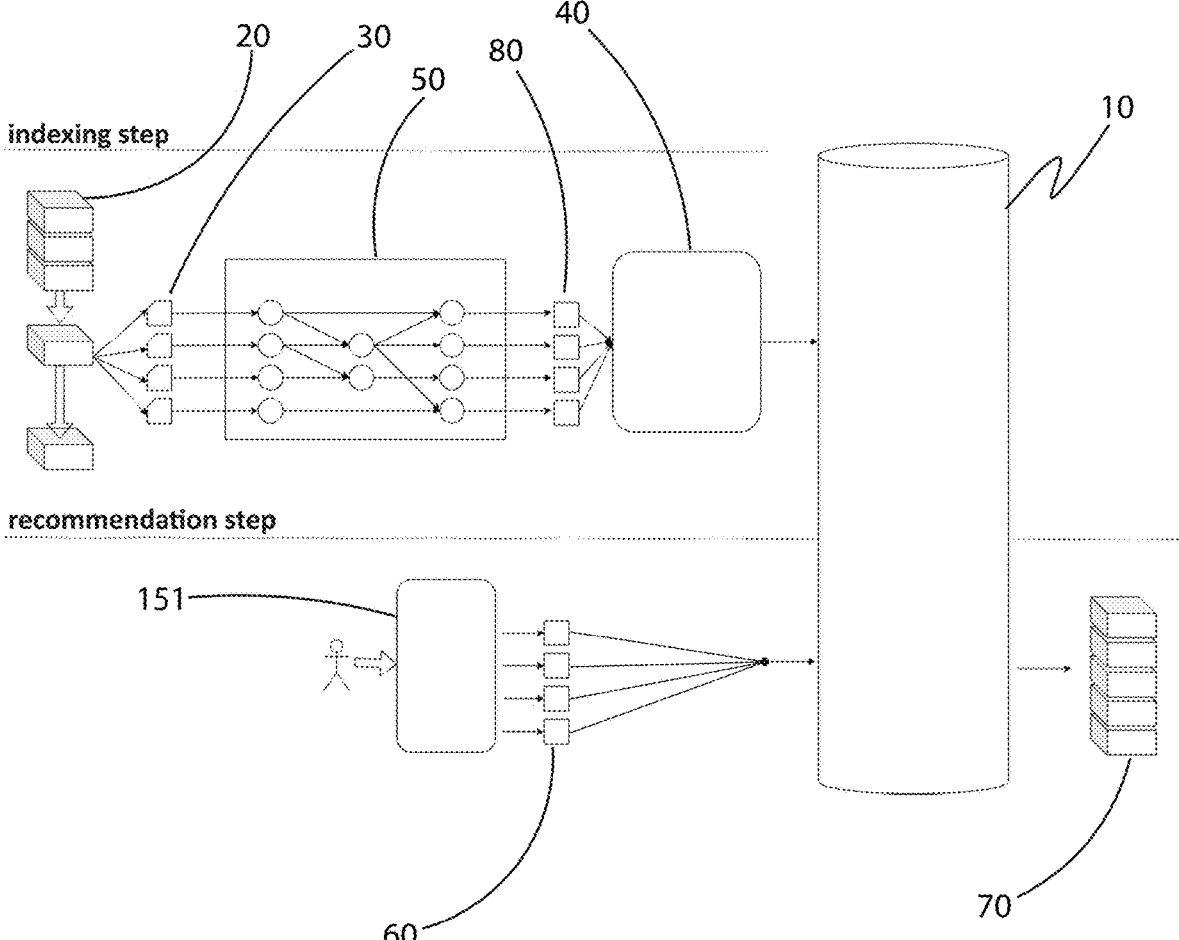
FIG. 2 is a block diagram graphically representing the method in FIG. 1.
Figure 3:
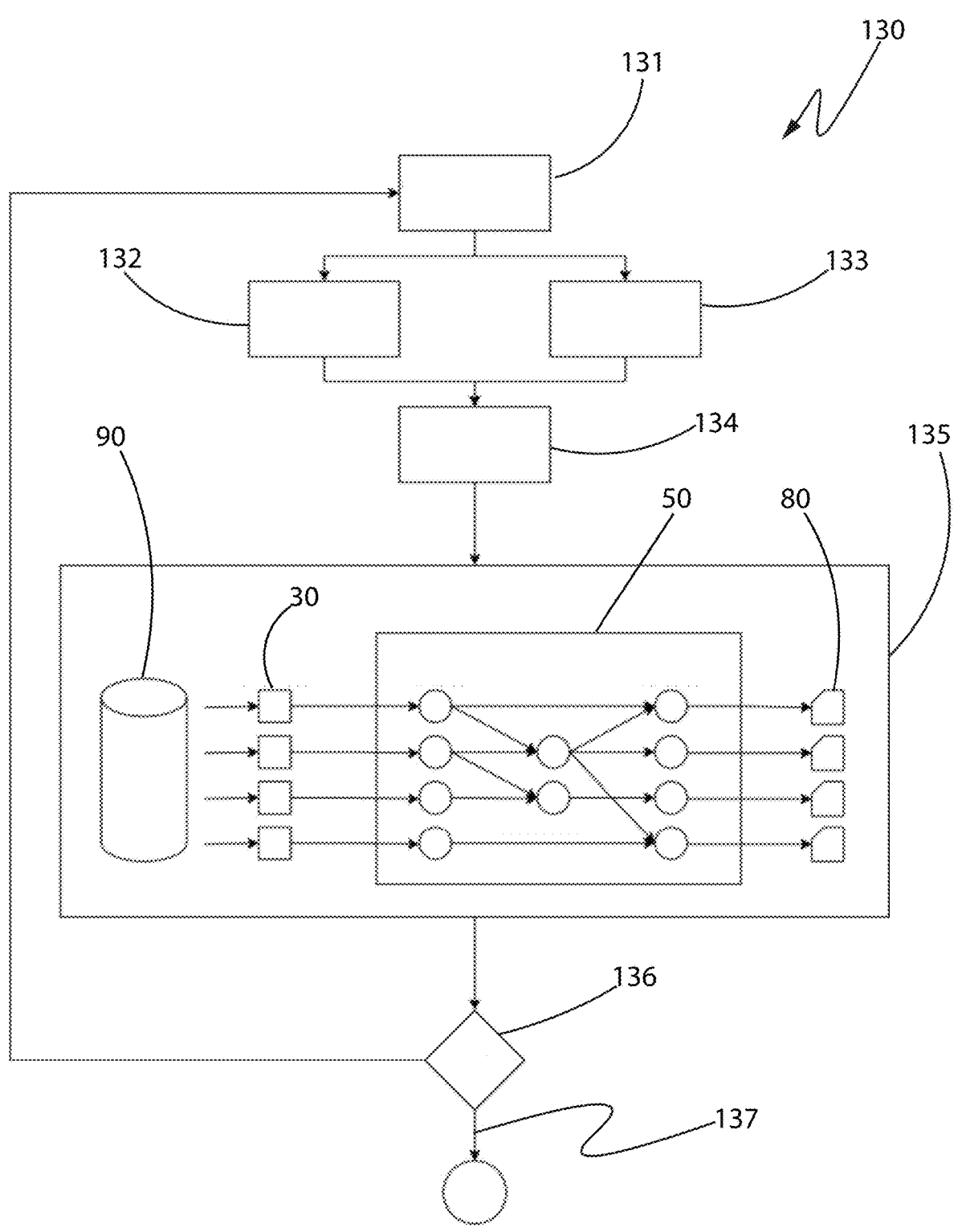
Figure 4:
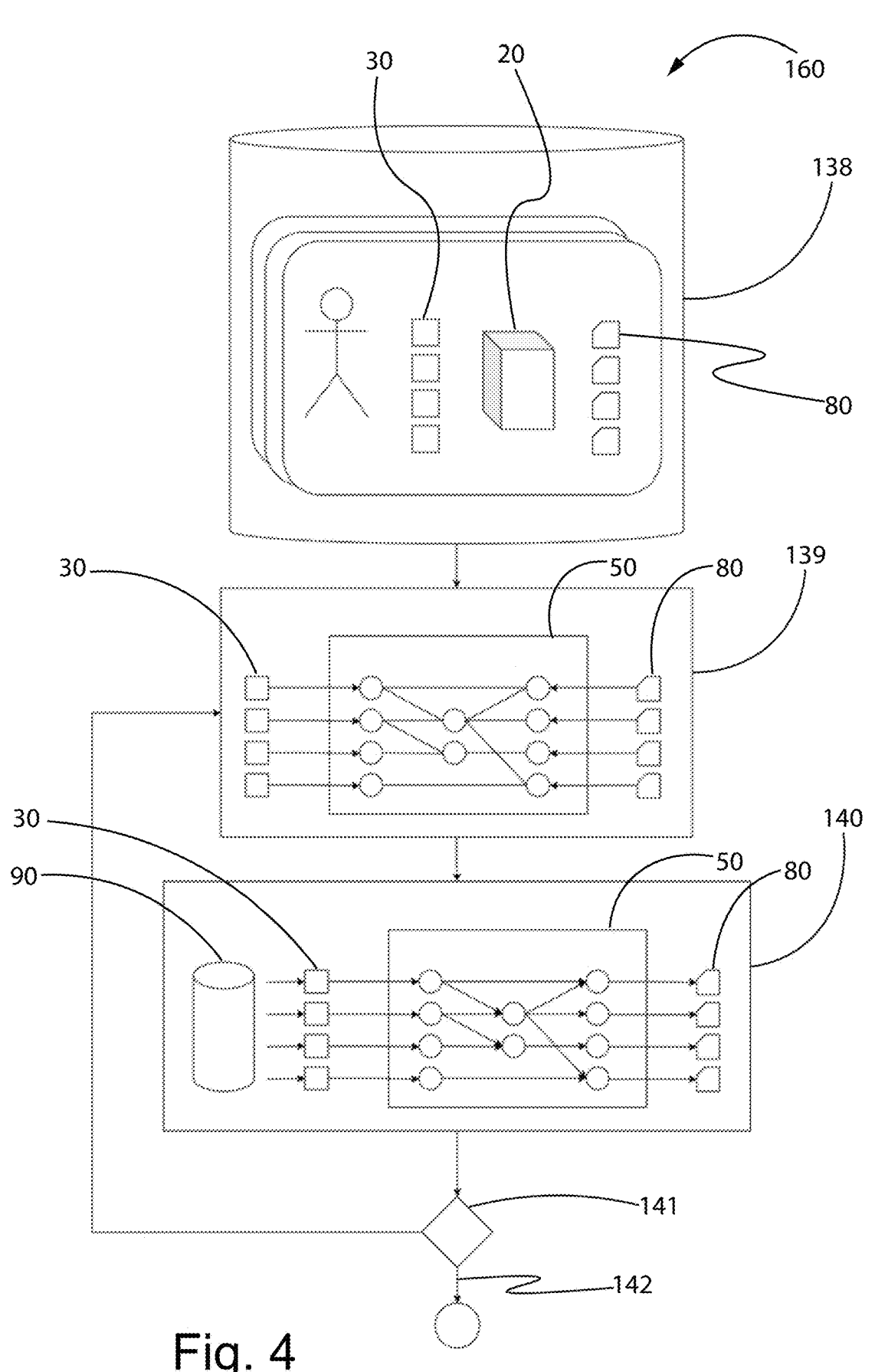

FIG. 3 a block diagram representing an embodiment of a modeling step of a Bayesian network used in an indexing step of the product recommendation method of FIG. 1;

FIG. 4 is a block diagram representing a potential enhancement of the modeling step of a Bayesian network in FIG. 2

Figure 5:
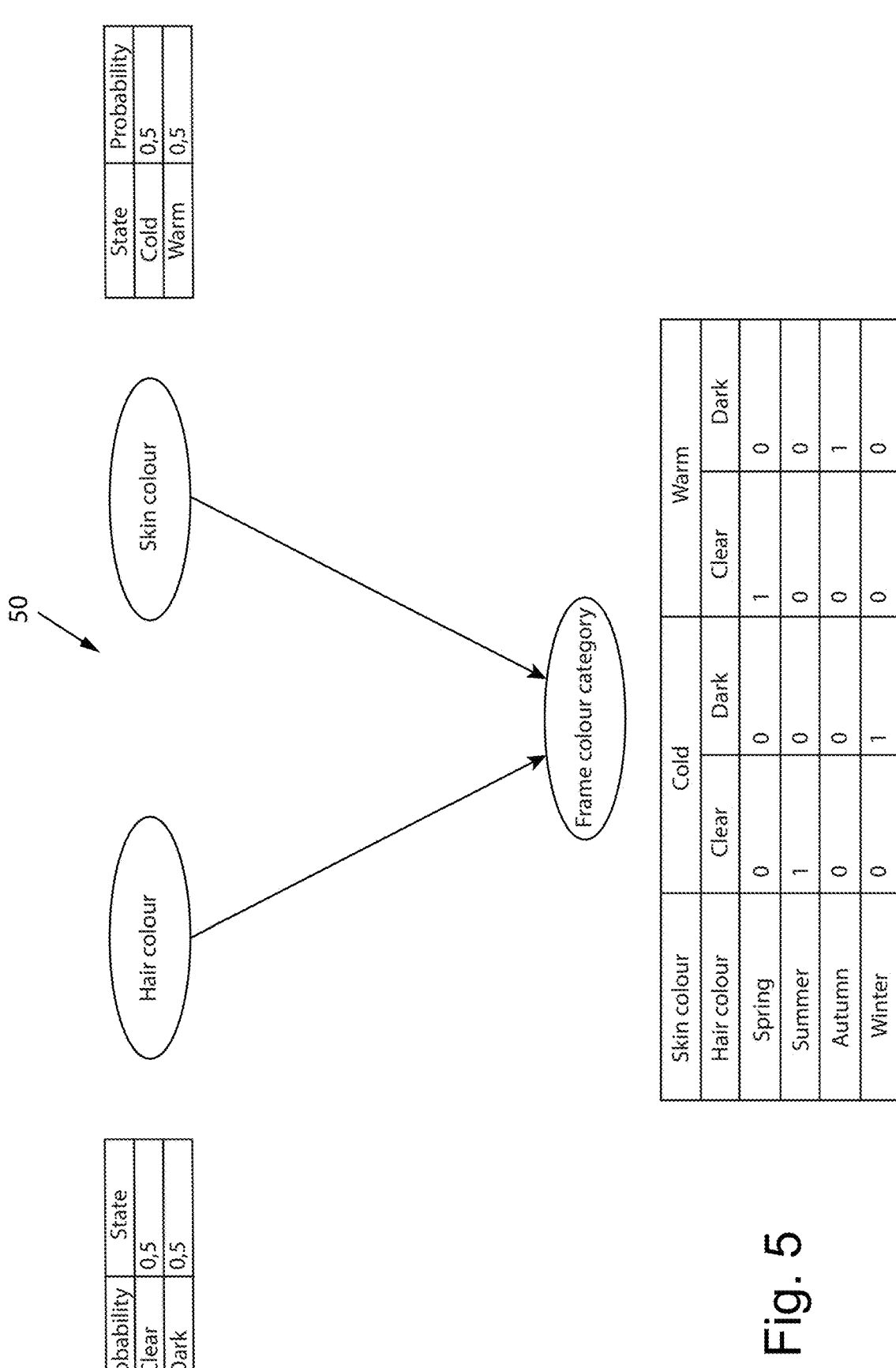

FIG. 5 is a partial schematic view of an example of a Bayesian network used in the product recommendation method according to the present invention.

With reference to the figures, a product recommendation method is shown, overall indicated with 100.

This product recommendation method 100 can be implemented by an electronic calculator provided with a data storing memory. In particular, the product recommendation method 100 is implementable by a product recommendation program or software loaded into the computer memory.

Such a product recommendation program thus comprises instructions making the electronic computer implement the product recommendation method 100 when the electronic computer executes the program.

The product recommendation program is associated with a search engine 10 acting on the Internet network e.g., integrated into an e-commerce platform. The product recommendation program is executed whenever a user carries out a search on the search engine associated with the program.

The product recommendation method 100 comprises an indexing step 110 in which the products 20 of a catalog are initially loaded for the first time in the domain searchable by a search engine.

In particular, the indexing step 110 for each product in the catalog comprises the following steps:

describing the product 111 by means of a first descriptor vector 30 having as components the product characteristics;

determining 112 the user characteristics most likely to be suitable for the product;

describing a user 113 likely suitable for the product by describing this most likely suitable user by means of a second descriptor vector 40 having as components the user characteristics most likely suitable for the product and the relative probabilities;

storing 120 in the domain searchable by the search engine the product in association with the most likely suitable user, i.e., storing the first descriptor vector 30 in association with the second descriptor vector 40. In one or more non-limiting embodiments, the indexing step describes a given product among a plurality of products of the catalog according to a first descriptor vector having as components a plurality of product characteristics. Accordingly, the first descriptor vector is loaded to the Bayesian network which calculates the probabilities associated with the plurality of the user-characteristics using the Bayesian network to generate user-characteristics of a most likely suitable user that is most likely to be suitable for the given product. The product characteristic data of the given product in association with the user-characteristics most likely to be suitable for the given product can then be stored in the domain searchable by the search engine such that the product characteristic data including the first descriptor vector is associated (e.g., can be directly matched) with the second descriptor vector.

The most likely suitable user refers to the user who is most likely to buy or search for or view a particular product online (i.e., on the Internet network).

For example, considering the glasses in a catalog as products, the components of the first descriptor vector 30 may be the length of the temples, the height of the lenses, the shape of the lenses, the material of the frame, the colour of the lenses and frame, the presence or absence of decorations, the vertical position of the hinges of the temples with respect to the lens, etc.

For example, the components of the second descriptor vector may be age, gender, face shape, eye and hair colour, etc. Preferably, the step of determining 112 the user characteristics most likely to be suitable for the product comprises the steps:

inputting 114 the first descriptor vector 30 of an input product to a Bayesian network 50 configured to receive as input the first descriptor vector 30 and calculating the probabilities associated with a plurality of user-characteristics;

calculating 115 the user-characteristics most likely suitable for the product as the user-characteristics having the highest probabilities 80 among those calculated by the Bayesian network 50.

Preferably, the Bayesian network 50 is realised by means of a modeling step of a Bayesian network 130, which will be described below.

Preferably, the modeling step of a Bayesian network 130 comprises at least the steps:

collecting 131 a plurality of interviews with experts in the field to which the products of the catalog belong, said interviews being related to the probabilities that a product with a plurality of characteristics can be chosen by a user with a plurality of characteristics;

defining 132 the causal relationships between product-characteristics of products and user-characteristics of users;

estimating 133 the conditional probabilities associated with the causal relationships defined on the basis of said collected interviews;

creating 134 the topology of the Bayesian network 50 on the basis of said defined causal relations and setting the conditional probabilities previously estimated for each one of said causal relations.

For example, in the portion of the Bayesian network illustrated in FIG. 5, there are three nodes, of which a first node represents the user-characteristic of hair colour, a second node represents the user-characteristic of skin colour and a third node represents the product-characteristic of the colour or colour categories to which the colour of the frame of a pair of glasses belongs. The first node is associated with a probability distribution between the characteristics "light hair colour" and "dark hair colour". In the case illustrated, these characteristics are equiprobable.

The second node is associated with a probability distribution between the characteristics "cold skin colour" and "warm skin colour". In the case illustrated, these characteristics are equiprobable.

The third node is associated with a probability distribution between the characteristics "winter colour category", "autumn colour category", "summer colour category", "spring colour category".

The terms "light", "dark", "cold", "warm", "winter", "spring", "autumn", "summer" refer to a predefined categorization.

Each colour category of the frame comprises a plurality of colours; the colours are in practice divided into groups in these colour categories according to a predefined logic.

As can be seen, the characteristic-product of the third node is determined on the basis of the values of the user-characteristics of the two nodes linked to the third node by respective causal relationships, i.e., arcs. For example, if the hair colour is light and the skin colour is warm, the colour category of the frame is the "spring" category.

In the case where only one of the two user-characteristics is available, e.g., "light" hair colour, the colour category of the frame will equiprobably be "spring" or "summer".

In the case where the user-characteristic of the third node is available as evidence, the Bayesian network is able to determine the user-characteristics of the first and second nodes.

For example, in the case of the "winter" colour category, the hair colour will be "dark" and the skin colour will be "cold". It is therefore understood how in the indexing step by inputting the first descriptor vector of a product into the Bayesian network one obtains the user characteristics most likely to be suitable for the product.

The modeling step of a Bayesian network 130 may comprise the steps:

carrying out 135 a test estimate on known cases using the previously created Bayesian network 50 by inputting in the Bayesian network 50 the first descriptor vector 30 of the products of the known cases and determining the second most likely suitable user descriptor vector by means of the Bayesian network 50;

comparing 136 the test estimate obtained from the Bayesian network 50 with the real data of the known cases;

if the test estimate obtained from the Bayesian network 50 corresponds to the real data within a predetermined tolerance interval, validating 137 the Bayesian network 50;

if the test estimate does not correspond to the real data within the predetermined tolerance interval, cyclically repeating, until the test estimate obtained from the Bayesian network 50 corresponds to the real data within the predetermined tolerance interval, the steps of collecting the plurality of interviews 131, definition of causal relationships 132, estimating the conditional probabilities 133, creating the Bayesian network 134, executing a test 135 and comparison 136 estimation, modifying for each cycle the causal relationships in the definition phase 132 and/or conditional probabilities in the estimation phase 133 and/or the Bayesian network in the creation step 134.

As described herein, the test estimate obtained from the Bayesian network can be compared with the real data of the known cases to determine whether the test estimate corresponds to the real data of the known cases within a predetermined tolerance interval. In this manner, the Bayesian network can be validated in response to the test estimate obtained from the Bayesian network corresponding to the real data within a predetermined tolerance interval, or continuously modified by cyclically repeating the validation steps to increase the accuracy of the Bayesian network until the Bayesian network is validated.

In particular, in order to modify the Bayesian network 50 it is possible to change the conditional probabilities, or to intervene on the levels of discretisation of the different variables, making them more finely granular; it is also possible to partially change the topology of the Bayesian network, possibly by separating nodes previously aggregated because they were not sufficiently expressive, or by aggregating into a single node only previously separated nodes because they were redundant, or by changing the causal relations, modifying the relations between the nodes, expressed as graph arcs.

In particular, the actual data of the known cases are stored in a database 90 and comprise, for example, actually occurred matches between product characteristics and characteristics of the user who purchased the product or viewed it.

Preferably, the modeling step of a Bayesian network 130 can also be based after a predetermined number of executions of the product recommendation method also on the use of an automatic self-learning algorithm, i.e., a machine learning algorithm.

In such a case, the modeling step of a Bayesian network 130 comprises a refining process of the Bayesian network 160 comprising the steps:

storing 138 the historical data relating to cases of matching between product-characteristics and most likely suitable user-characteristics, wherein said matching has had a positive outcome measured according to one or more predetermined indicators (sales made, clicks on the proposed product, etc.);

executing 139 an automatic self-learning algorithm programmed to modify the conditional probabilities or at least part of the topology and conditional probabilities of the Bayesian network on the basis of the stored historical data;

performing 140 a test estimate on known cases using the previously created Bayesian network by inputting the first descriptor vector 30 of the products of the known cases in the Bayesian network and determining the second probably suitable user descriptor vector by means of the Bayesian network;

comparing 141 the test estimate obtained from the Bayesian network with the real data of the known cases;

if the test estimate obtained from the Bayesian network corresponds to the real data within a predetermined tolerance interval, validating 142 the Bayesian network;

if the test estimate does not correspond to the real data within the predetermined tolerance interval, cyclically repeating, until the test estimate obtained from the Bayesian network corresponds to the real data within the predetermined tolerance interval, the following steps:

the step of executing the automatic self-learning algorithm 139, wherein the automatic self-learning algorithm modifies at each cycle the conditional probabilities or at least part of the topology and the conditional probabilities of the Bayesian network on the basis of the historical data stored and the difference between the estimate and real data calculated in the previous cycle. According to one or more non-limiting embodiments, the step of executing the automatic self-learning algorithm 130 may further include the step of executing a test estimate 140 and the comparison phase 141, which includes performing the step of comparing the estimate obtained from the Bayesian network with the real data of the known cases. The refining process 160 of the Bayesian network is an iterative process aimed at finding the main determinants of a certain dataset, which are used to define the topology of the Bayesian network and then the conditional probabilities that minimise errors at the nodes to which the arcs of the Bayesian network point. According to a non-limiting embodiment, the topology of the Bayesian network is defined by a certain dataset including a plurality of nodes, and one or more arcs defining a relationship of related nodes among the plurality of nodes. Accordingly, the refining process identifies determinants of the certain dataset and the conditional probabilities to minimize errors at the nodes to which the arcs of the Bayesian network point.

When the programmed self-learning algorithm is executed for the first time, it modifies the Bayesian network previously validated in step 137.

In subsequent executions, the programmed self-learning algorithm modifies the Bayesian network that was in turn modified in the previous cycle.

The product recommendation method 100 comprises a recommendation step 150 comprising the steps of:

obtaining 151 the user-characteristics of the user who is carrying out the search and defining a third vector descriptor 60 whose components are the user-characteristics collected;

calculating 152 the vector distances between the third descriptor vector and the second stored descriptor vectors;

determining 153 an ordered list of second descriptor vectors 40 starting from the second descriptor vector 40 having a minimum vector distance from the third descriptor vector 60 up to the second descriptor vector 40 having a maximum vector distance from the third descriptor vector 60 according to an increasing distance criterion, thus obtaining a corresponding ordered list of first descriptor vectors 30 that is an ordered list of products 70 from the most likely one to the least likely one to be suitable;

making the ordered list of products 70 available to the user 156.

In particular, the product most likely to be suitable for the user is described by the first descriptor vector 30 associated with the second descriptor vector 40 at a minimum distance from the third descriptor vector 60. Otherwise, the product least likely to be suitable for the user is described by the first descriptor vector 30 associated with the second descriptor vector 40 at a maximum distance from the third descriptor vector 60.

The ordered product list 70 is made available to the user by displaying it on the screen of the terminal used by the user.

The recommendation step 150 is performed every time it is wished to return recommended products to the user. For example, the recommendation step 150 is performed each time a user carries out a search on the search engine. Alternatively or in addition to the case where the user carries out a search, the recommendation step 150 may be performed according to any rule. For example, the recommendation step 150 may be made so that it proposes products when the user starts a certain software application.

In particular, the steps of calculating 152 the vector distances and determining 153 the ordered product list 70 are performed by the search engine.

Preferably, the step of obtaining 151 the user-characteristics comprises a step of extracting 154 a first plurality of user-characteristics from a registered user profile. For example, the registered profile may be the one associated with a user account on an e-commerce site.

Alternatively or preferably in addition to the extraction step 154, the step of obtaining 151 the user-characteristics may comprise the step of determining 155 a second plurality of user-characteristics by means of an automatic self-learning algorithm configured to determine said second plurality of user-characteristics from an acquired image of the user.

The step of determining 155 of a second plurality of user-characteristics is based on computer vision and machine learning algorithms which, upon receiving an image of a user's face as input, are able to extract some or all of the above-mentioned user-characteristics, e.g., eye colour, face shape, hair colour, etc.

In the event that this step of determining 155 is able to extract (via depth cameras or other means) metric information on certain user characteristics, they may also be used in the user information vector, such as head or nose size.

From the description made, the characteristics of the product recommendation method object of the present invention are clear, as are the relative advantages.

The indexing step, in fact, being carried out by using the Bayesian network has the advantages of the product recommendation methods of the third type. The Bayesian network used in the indexing step is realised on the basis of a simplified elicitation process in that experts in the field are asked to express themselves in probabilistic rather than deterministic terms.

The predictive behaviour of the Bayesian network is expressed as combinations of joint probabilities, which offers the possibility of representing knowledge that cannot immediately be formalised in logic form, as for example in the fashion industry. This also makes it possible to obtain results from implicit patterns that were not initially foreseen.

In addition, if a machine learning algorithm is also used, the Bayesian network is modified on the basis of the historical data that are stored over time. In other words, the product recommendation method at the beginning of its operational life is implemented on the basis of an indexing step performed by using a Bayesian network realised on the basis of an elicitation process. After a certain number of executions, the Bayesian network is modified on the basis of what happened during these executions. The problem of cold start is avoided.

The use of the Bayesian network in the indexing step makes it possible to create direct matches between each product of the catalog and the most likely suitable user, an ideal user whose characteristics are the most likely to be suitable for the respective product. These direct matches simplify and speed up the recommendation step, which does not have the Bayesian network in the critical path of the process and therefore has minimal calculation times. The recommendation step does not involve high architectural complexity and the computer that executes the product recommendation program must not be structured for excessive workloads.

Finally, it is clear that the product recommendation method thus conceived is susceptible of numerous modifications and variations, all of which are within the scope of the invention; moreover, all the details can be replaced by technically equivalent elements. In practice, the materials used, as well as their dimensions, can be of any type according to the technical requirements.

The invention claimed is:

1. A product recommendation method implemented by an electronic computer provided with a memory configured to store data, said product recommendation method being associated to a search engine and comprising:

an indexing step wherein a plurality of products of a catalog are initially loaded in a domain searchable by the search engine, said indexing step for each product of the catalog comprising steps of:

describing a given product among the plurality of products of the catalog according to a first descriptor vector having as components a plurality of product characteristics;

determining user-characteristics corresponding to the product;

describing a user corresponding to the product according to a second descriptor vector having as components the user-characteristics corresponding to the product and probabilities associated with a plurality of the user-characteristics;

inputting the first descriptor vector to a Bayesian network defined by a certain dataset including a plurality of nodes associated with conditional probabilities, and one or more arcs associated with causal relationships and which define a relationship of related nodes among the plurality of nodes;

calculating the probabilities associated with the plurality of the user-characteristics using the Bayesian network to generate user-characteristics of a most likely suitable user that is most likely to be suitable for the given product;

storing in the domain searchable by the search engine product characteristic data of the given product in association with the user-characteristics most likely to be suitable for the given product, the product characteristic data including the first descriptor vector in association with the second descriptor vector;

a recommendation step including steps of:

obtaining the user-characteristics of the user who is carrying out the search and defining a third vector descriptor including components corresponding to the user-characteristics;

calculating vector distances between the third descriptor vector and each of the second descriptor vectors;

determining an ordered list of the second descriptor vectors starting from the second descriptor vector having a minimum vector distance from the third descriptor vector up to the second descriptor vector having a maximum vector distance from the third descriptor vector according to an increasing distance criterion;

obtaining a corresponding ordered list of first descriptive vectors that is an ordered list of products from a most likely product suitable for the user to a least likely product suitable for the user; and displaying the ordered list of products to the user, wherein the Bayesian network is trained and refined over a plurality of cycle of iterations using a refining process that identifies determinants of the certain dataset and the conditional probabilities associated with the nodes, and modifying for each cycle of the iterations one or both of the causal relationships to modify the nodes and the conditional probabilities to modify the arcs, thereby minimizing errors at the nodes to which are pointed to by the arcs associated with the causal relationships, wherein the refining process comprises:

storing historical data relating to cases of matching between product-characteristics and most likely suitable user-characteristics, wherein said matching has had a positive outcome measured according to one or more predetermined indicators;

executing an automatic self-learning algorithm that continuously changes a topology of the Bayesian network to reduce errors and increase an accuracy of the Bayesian network by modifying the conditional probabilities or at least part of the topology and conditional probabilities of the Bayesian network on the basis of the stored historical data;

performing a test estimate on known cases using the previously created Bayesian network by inputting the first descriptor vector of the products of the known cases in the Bayesian network and determining the second probably suitable user descriptor vector by means of the Bayesian network;

comparing the test estimate obtained from the Bayesian network with the real data of the known cases to determine whether the test estimate corresponds to the real data of the known cases within a predetermined tolerance interval;

validating the Bayesian network in response to the test estimate obtained from the Bayesian network corresponding to the real data within the predetermined tolerance interval;

in response to the test estimate not corresponding to the real data within the predetermined tolerance interval, cyclically repeating refining steps, until the test estimate obtained from the Bayesian network corresponds to the real data within the predetermined tolerance interval, the refining steps comprising:

executing the automatic self-learning algorithm, wherein the automatic self-learning algorithm modifies, at each cycle among the plurality of cycles, at least part of the topology by changing one or more of the causal relationships between the related nodes, and modifies the conditional probabilities of the Bayesian network on the basis of the historical data stored and the difference between the estimate and real data calculated in the previous cycle;

performing the test estimate;

comparing the test estimate obtained from the Bayesian network with the real data of the known cases; and continuously modifying the at least part of the topology of the Bayesian network and the associated conditional probabilities until the test estimate corresponds to the real data within the predetermined tolerance interval.

2. The product recommendation method according to claim 1, wherein the Bayesian network creates direct matches between each product of the catalog and the most likely suitable user.

3. The product recommendation method according to claim 2, wherein the step of determining the user-characteristics corresponding to the product comprises steps of:

calculating the user-characteristics most likely suitable for the product as the user-characteristics having the highest probabilities among those calculated by the Bayesian network.

4. The product recommendation method according to claim 3, wherein the Bayesian network is generated according to a modeling step of a Bayesian network, the modeling step comprising steps of:

collecting a plurality of interviews with experts in a field to which the products of the catalog belong, said interviews being related to the probabilities that a product with a plurality of characteristics can be chosen by a user with a plurality of characteristics;

defining the causal relationships between product-characteristics of products and user-characteristics of users;

estimating the conditional probabilities associated with the causal relationships defined on the basis of said collected interviews; and creating a topology of the Bayesian network on the basis of said defined causal relations and setting the conditional probabilities previously estimated for each one of said causal relations.

5. The product recommendation method according to claim 4, wherein the modeling step of the Bayesian network comprises steps of:

carrying out a test estimate on real data of known cases using a previously created Bayesian network by inputting in the Bayesian network the first descriptor vector of the products of the known cases and determining the second most likely suitable user descriptor vector by means of the Bayesian network;

comparing the test estimate obtained from the Bayesian network with the real data of the known cases to determine whether the test estimate corresponds to the real data of the known cases within a predetermined tolerance interval;

validating the Bayesian network in response to the test estimate obtained from the Bayesian network corresponding to the real data within a predetermined tolerance interval;

in response to the estimate not corresponding to the real data within the predetermined tolerance interval, cyclically repeating steps to increase the accuracy of the Bayesian network until the test estimate obtained from the Bayesian network corresponds to the real data within the predetermined tolerance interval, wherein the steps to increase the accuracy of the Bayesian network comprises:

collecting the plurality of interviews, definition of causal relationships;

estimating the conditional probabilities, creating the Bayesian network;

executing a test and comparison estimation;

modifying for each cycle one or combination of the causal relationships in the definition phase, and conditional probabilities in the estimation phase, and the Bayesian network in the creation step.

6. The product recommendation method according to claim 5, wherein the modeling step of the Bayesian network comprises the refining process of the Bayesian network comprising steps of:

storing historical data relating to cases of matching between product-characteristics and most likely suitable user-characteristics, wherein said matching has had a positive outcome measured according to one or more predetermined indicators;

executing an automatic self-learning algorithm programmed to modify the conditional probabilities or at least part of the topology and conditional probabilities of the Bayesian network on the basis of the stored historical data;

performing a test estimate on known cases using the previously created Bayesian network by inputting the first descriptor vector of the products of the known cases in the Bayesian network and determining the second probably suitable user descriptor vector by means of the Bayesian network;

comparing the estimate obtained from the Bayesian network with the real data of the known cases;

validating the Bayesian network in response to the estimate obtained from the Bayesian network corresponding to the real data within a predetermined tolerance interval;

in response to the estimate not corresponding to the real data within the predetermined tolerance interval, cyclically repeating steps to increase the accuracy of the Bayesian network until the estimate obtained from the Bayesian network corresponds to the real data within the predetermined tolerance interval, wherein the steps to increase the accuracy of the Bayesian network comprises:

executing the automatic self-learning algorithm, wherein the automatic self-learning algorithm modifies at each cycle the conditional probabilities or at least part of the topology and the conditional probabilities of the Bayesian network on the basis of the historical data stored and the difference between the estimate and real data calculated in the previous cycle, performing the test estimate; and performing the step of comparing the test estimate obtained from the Bayesian network with the real data of the known cases.

7. The product recommendation method according to claim 1, wherein the step of obtaining the user-characteristics comprises a step of extracting a first plurality of user-characteristics from a registered user profile.

8. The product recommendation method according to claim 1, wherein the step of obtaining the user-characteristics comprises a step of determining a second plurality of user-characteristics by means of an automatic self-learning algorithm configured for determining said second plurality of user-characteristics from an acquired image of the user.

9. The product recommendation method according to claim 1, wherein the user-characteristics include one or a combination of age, gender, face shape, eye colour, hair colour, and skin colour, height, weight, and area of origin.

10. The product recommendation method according to claim 6, wherein the refining process identifies determinants of the certain dataset and the conditional probabilities to minimize errors at the nodes to which the arcs of the Bayesian network point.

11. The electronic computer including memory storing a computer program, the computer program comprising instructions making the electronic computer implement the product recommendation method according to claim 1.

\*    \*    \*    \*    \*